United States Patent

Tabuchi

Patent Number: 5,950,215
Date of Patent: Sep. 7, 1999

[54] SYSTEM FOR MANAGING A COMPOUND DOCUMENT

[75] Inventor: Masahiro Tabuchi, Tokyo, Japan

[73] Assignee: NEC Corporation, Tokyo, Japan

[21] Appl. No.: 08/598,191

[22] Filed: Feb. 7, 1996

[30] Foreign Application Priority Data

Feb. 7, 1995 [JP] Japan .................... 7-019013

[51] Int. Cl.⁶ .................... G06F 17/27
[52] U.S. Cl. .................... 707/515
[58] Field of Search .................... 395/326, 602, 395/609, 618–19, 772, 761, 776–78, 784–5, 788, 790–793; 707/501, 511, 514–16, 203

[56] References Cited

U.S. PATENT DOCUMENTS

| | | | |
|---|---|---|---|
| 5,012,405 | 4/1991 | Nishikado et al. | 707/8 |
| 5,291,405 | 3/1994 | Kohari | 707/500 |
| 5,315,697 | 5/1994 | Nagamatsu | 345/328 |
| 5,421,012 | 5/1995 | Khoyi et al. | 395/677 |
| 5,446,891 | 8/1995 | Kaplan et al. | 707/2 |
| 5,600,829 | 2/1997 | Tsatalos et al. | 707/2 |
| 5,630,117 | 5/1997 | Oren et al. | 707/100 |
| 5,634,018 | 5/1997 | Tanikoshi et al. | 345/329 |
| 5,669,005 | 9/1997 | Curbow et al. | 707/523 |
| 5,694,594 | 12/1997 | Chang | 707/6 |

FOREIGN PATENT DOCUMENTS

| | | |
|---|---|---|
| 1-270167 | 10/1989 | Japan . |
| 3-265968 | 11/1991 | Japan . |
| 4-177568 | 6/1992 | Japan . |
| 5-143599 | 6/1993 | Japan . |
| 5-189431 | 7/1993 | Japan . |
| 6-195339 | 7/1994 | Japan . |

OTHER PUBLICATIONS

Brockschmidt, "Inside OLE 2", Microsoft Press Programming Series, pp. 3–25, (1994).
The OpenDoc Design Team, "OpenDoc Technical Summary", Apple Computer Inc., pp. 1–54, (1994).

*Primary Examiner*—Anton Fetting
*Attorney, Agent, or Firm*—Foley & Lardner

[57] ABSTRACT

A compound document managing system includes a compound document managing unit for embedding or linking data produced by an application in or with data produced by other applications and managing the data as a compound document. The application includes a context information managing unit for setting or releasing context information indicative of semantics common among a plurality of applications, and includes data distribution ranges, data presentation targets and data production source information, and history information, to or from data embedded in or linked with the compound document. Tthe system also includes a selection unit for selecting specific context information set to data to specify data corresponding to the selected context information. The compound document managing unit includes a control unit responsive to a request for setting or selecting context information to or out of the data of the compound document for starting and controlling the context information managing unit and the selection unit of the application corresponding to the data.

2 Claims, 9 Drawing Sheets

SYSTEM FOR MANAGING A COMPOUND DOCUMENT

BACKGROUNDS OF THE INVENTION

1. Field of the Invention

The present invention relates to a compound document managing system that can manage a compound document, including text data and multimedia data such as image data and voice data, and edit the multimedia data embedded in the compound document by relating the data with an application that created the data.

2. Description of the Related Art

With the advance in computer technology, there is a growing tendency to deal with a compound document file formed by embedding not only text data but also multimedia data such as image data, time-varying image data, voice data or the like in a document file.

According to a conventional compound document managing system for managing such compound document file, the multimedia data embedded in the compound document can be edited using the application that created the data, by relating an individual multimedia data embedded in the compound document with the corresponding application that created the multimedia data. When the data being referred to (called "linking" hereinafter) in the compound document is updated using of the application that created the data, the updated content is automatically reflected in the data within the compound document. For example, "OLE" (Object Linking and Embedding) manufactured by Microsoft CO., "OpenDoc" manufactured by Apple Computer, Inc. discloses such compound document managing system.

Figure 9:
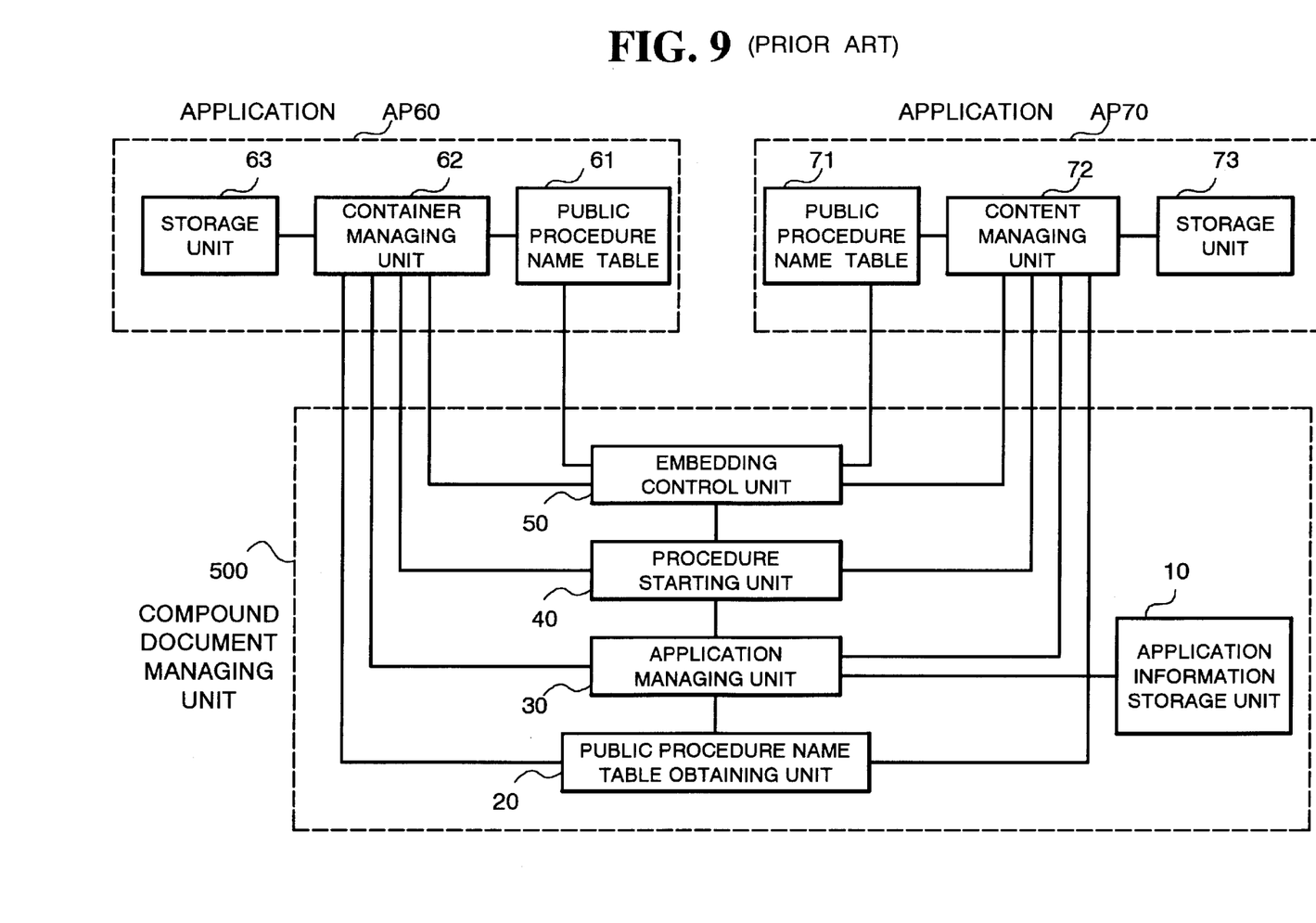
FIG. 9 is a block view expressing a concept of a conventional compound document managing system.

FIG. 9 is a block view showing an example of an organization of this kind of conventional compound document managing system.

This compound document managing system comprises a compound document managing unit 500, including an application information storage unit 10, a public procedure name obtaining unit 20, an application managing unit 30, a procedure starting unit 40 and an embedding control unit 50, and applications AP60 and AP70, which are utilized by the compound document managing unit 500. In order to constitute a compound document managing function, the application AP60 is provided with a predetermined public procedure name table 61, a container managing unit 62 and a storage unit 63 for storing the compound document data therein, and also the application AP70 is provided with a predetermined public procedure name table 71, a content managing unit 72 and a storage unit 73 for storing the compound document data therein. Procedure names and procedure addresses corresponding to the names are stored in the public procedure name tables 61 and 71. Formats of the tables are previously determined.

The public procedure name obtaining unit 20 acquires procedure names by referring to the public procedure name tables 61, 71 of the respective applications AP60, AP70.

The application managing unit 30 is provided with a function to register combination information, which indicates relation between the respective applications AP60, AP70 and the types of the data generated by the applications, as application information in the application information storage unit 10, as well as a function to start the corresponding application AP60 or AP70 on the basis of the type of the given data.

In accordance with a request from one of the applications AP60, AP70, the procedure starting unit 40 starts a procedure in the other application and obtains the result. It is thus possible to start a desired procedure on the basis of the public procedure name tables 61, 71. Even when the applications AP60, AP70 exist in logically different memory spaces, the procedure starting unit 40 starts a procedure of any application of the two and obtains the result.

The embedding control unit 50 controls execution of procedure process inclusive of calling sequences, which are frequently performed when using the procedure names stored in the public procedure name tables 61 and 71.

More specifically, in case of newly embedding data of the application AP60 in a document, the embedding control unit 50 defines, as one procedure, a series of procedures for starting the application AP60 through the application managing unit 30, obtaining a procedure of creating data of the application AP60 from the public procedure name table 61 by using the public procedure name obtaining unit 20, and starting a procedure necessary for creating the data obtained from the public procedure name table 61 by the procedure starting unit 40, and the embedding control unit 50 controls the execution of the series of procedures. When extracting the application information by utilizing the procedure of the content managing unit 72 and storing the information and data, the embedding control unit 50 defines a series of procedures for referring to the public procedure name table 71 and calling the procedure of the content managing unit 72 as one procedure, and controls the execution thereof.

The applications that utilize the compound document managing unit 500 are of the type having a function to paste the data created by another application in the compound document, a function to create data that can be pasted in the compound document so to supply the data to another application, and both of the above-described functions.

Figure 10:
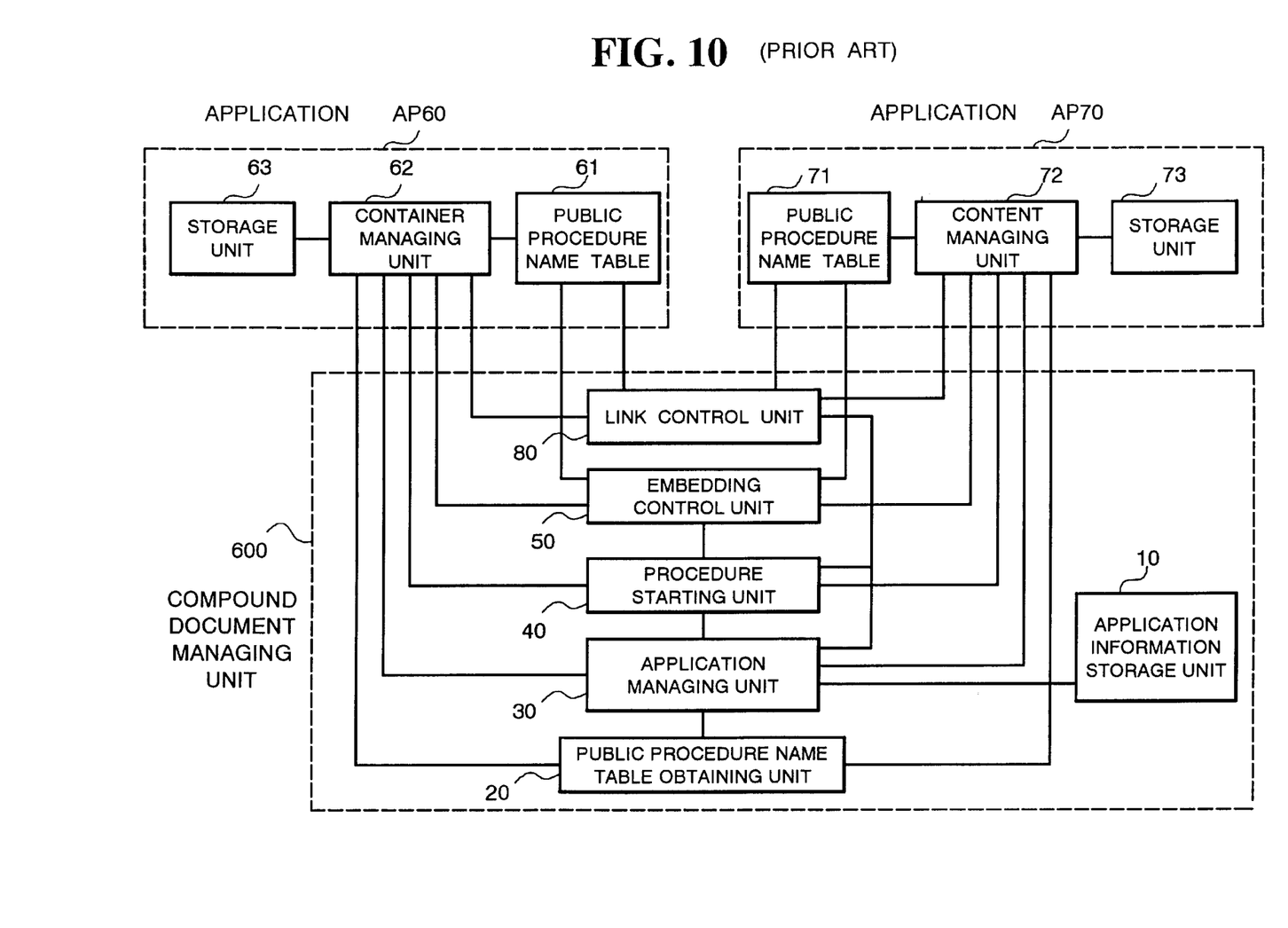
FIG. 10 is a block view expressing a concept of another conventional compound document managing system.

Because the application having both functions can be readily understood from the applications of the remaining two types, it is supposed that the remaining two types of applications are used in FIGS. 9 and 10. That is to say, the application AP60 is of the type that can paste the data created by another application in the document, and the application AP70 is of the type that can supply the data capable of being pasted to another application.

In the application AP60 dealing with the compound document in which the data can be pasted, addresses of a series of procedures (sub-module) corresponding to functions of the container managing unit 62 are respectively assigned to entries of the previously defined public procedure name table 61. Thus, a procedure registered in the public procedure name table 61 can be called by the embedding control unit 50.

The container managing unit 62 manages layout information such as the position, largeness and size of the data in the document as a container. The container managing unit 62 acquires a procedure (function) of the content managing unit 72 provided in the application AP70 via the public procedure name obtaining unit 20, by referring to the public procedure name table 71, and operates the content of the data by calling the corresponding procedure. The content managing unit 72 provides a series of common procedures for editing data to be pasted in a plurality of and different kinds of compound documents.

In the application AP70, which supplies the data capable of being pasted, addresses of a series of procedures (sub-module) corresponding to functions of the content managing unit 72 are respectively assigned to entries of the previously defined public procedure name table 71.

The content managing unit 72 obtains a procedure of the container managing unit 62 provided in the application AP60 via the public procedure name obtaining unit 20, by referring to the public procedure name table 61, and notifies modification of the content of the data by utilizing the obtained procedure, or stores the data managed by the container managing unit 62.

Assuming that the applications AP60, AP70 are provided with the functions as mentioned above, the compound document managing unit 500 obtains a required procedure through the public procedure name obtaining unit 20 by referring to the public procedure name tables 61, 71 without recognizing the internal structures of the applications AP60, AP70, and starts the procedure obtained from the public procedure name tables 61 and 71 by using the procedure starting unit 40, or prepares the embedding control unit 50 for starting the applications AP60, AP70 by using the application managing unit 30.

In the case where the application AP60 having the content managing unit 62 is started relative to the compound document in which the data created by the application AP70 having the content managing unit 72 is embedded, the embedding control unit 50 at first acquires an identifier corresponding to a public procedure name table 71 to obtain an editing procedure of the content managing unit 70 of the application AP70 by using the public procedure name obtaining unit 20. When editing the data created by the application AP70 embedded in the compound document, the embedding control unit 50 starts the objective application AP70 on the basis of the application information accompanying with the data by means of the application managing unit 30.

As a result, the procedure held by the public procedure name table 71 becomes a procedure for editing to constitute the content managing unit 72 of the started application AP70, and the procedure can be called by referring to the public procedure name table 71. Accordingly, as for the application AP60 having the container managing unit 62 and the application AP70 having the content managing unit 72, the predetermined public procedure name tables 61, 71 possess the addresses of the procedures of the container managing unit 62 and the content managing unit 72, respectively, so that the respective public procedure name tables 61, 71 can be referred to on the basis of the functions provided by the compound document managing unit 500. The two different applications AP60 and AP70 thus operate as if they share roles of changing and modifying layout of the data.

FIG. 10 is a block view showing an organization of another conventional compound document control unit 600.

As illustrated, this compound document control unit 600 further comprises a link control unit 80 in addition to the compound document control unit 500 of FIG. 9 comprising the application storage unit 10, the public procedure name obtaining unit 20, the procedure starting unit 40 and the embedding control unit 50.

When the data of the application AP70 is embedded in the container of the document of the application AP60, a link control unit 80 does not embed the whole data of the application AP70 as it is, but links to the container only an identifier that indicates a part of the document of the referred application AP70.

For example, only the identifier indicating the document data of the referred application AP70 is stored as a link data in the document of the application AP60, which has been arranged to be linked to the document of the application AP70. At a result, the document of the application AP60 need not possess the whole data corresponding to a reference part of the document data in the application AP70, thereby making the file size of the application AP60 small.

Even if editing is added to the data of the referred application AP70, the original data of the application AP60 is not altered. However, the alteration of the data in the application AP70 is reflected in the original data of the application AP60, since the identifier showing the document data is only stored as a link data.

At this time, in the document of the application AP60, the identifier showing the data of the application AP70 and the information of the alteration work showing the content of the alteration work to be added to the data are stored as a link data. Therefore, if a part of the document of the application AP70, that is the original data, is updated, the alteration added to the original data is automatically reflected in the document of the application AP60.

For example, assume that in the document of the application AP60 referring to the computer graphics, which are data of the application AP70, size or color is altered and shadow is added in some pages (linked portions). At this time, the link data including the identifier indicating the computer graphics and the respective alteration work of every linked portion is stored in the document of the application AP60. Therefore, if precisely rewriting the computer graphics in the part of the application AP70, the computer graphics rewritten precisely (having altered in size or color, or having shadow added there) is reflected in the document of the application AP60 automatically. Also, in this case, the document of the application AP60 need not possess more than one data of the original computer graphics, thereby to save the memory with respect to the size of the document and the data transfer amount at update. It is all the same if replacing the application AP60 by AP70 and linking data in the mutual documents.

The conventional compound document control system as mentioned above is capable of relating each data of the compound document with an application that created the corresponding data. However, it is impossible to control information about such history and quality of the data (hereinafter, referred to as semantic information), e.g., "the information showing who has edited", "the information showing whom the data is to be shown", "the information showing emergency and priority of the data", which are important points under such distributed environment where computers are connected through a network.

For example, assume that an audience can write questions in presentation materials prepared by a presenter, looking at the materials by using the respective application for the presentation. Under this environment, if it is possible to automatically start an application for sending electronic mail, the presenter could send a response to each question written by the audience regarding the presentation materials, which will be very convenient.

However, in the conventional compound document managing system, the application information for starting an application that created the data is only related with the corresponding data. Owing to this, it is impossible to automatically find a destination to send a response to a question, that prevents the application for the electric mail starting, though it is possible to start the application for the presentation utilized when writing questions in the presentation materials.

The "semantic information showing who has edited" is an important information in the application operated by more than one person at a time. Then, "the information showing history (version) of the data" and "the information showing priority of the data" are important semantic information for the users dealing with the compound documents mainly.

Since the semantic information about such history and quality of the data cannot be related with the data in the conventional compound document managing system, the semantic information must be related with the data in every application. Briefly, the semantic information that has been related is only available in the corresponding application. Accordingly, in the conventional system, users are forced to select and execute the operational procedure with a lot of trouble, which procedure will be easy if automation is realized like an electric mail program mentioned above.

SUMMARY OF THE INVENTION

In order to dissolve the above-mentioned problem, the present invention is aimed to provide a compound document managing system capable of relating common semantic information in the compound document, standardizing and automating the related procedure for utilizing this information, retrieving update information of the data among application programs, and simplifying exchange of the data among users.

According to one aspect of the invention, a compound document managing system comprises compound document managing means for embedding data created by an application in data created by other applications and managing the data as a compound document, the application including:

context information managing means for setting or releasing context information indicative of semantics common among a plurality of applications to or from the data embedded in the compound document, and selection means for selecting specific context information set to the data to specify data corresponding to the selected context information, and the compound document managing means including control means for starting and controlling the context information managing means and the selection means of the application corresponding to the data in response to a request for setting or selecting the context information to or out of the compound document data.

In the preferred construction, the context information includes information of data distribution ranges, data presentation targets and data production sources, and history information.

In the preferred construction, the context information managing means of the application sets a plurality of different context information according to data to containers in which data is to be embedded and allocated in specific layout of said compound document, and the selection means of the application selects specific context information among the plurality of context information or combines the plurality of context information to specify the container.

In the further preferred construction, the compound document managing means holds application information for designating an application to be started in association with the context information set to said data and includes means for starting the application designated by the application information according to the selected context information.

In the above-mentioned construction, the application includes a procedure table for storing addresses of the operation procedures provided by the context information managing means and the context information selecting means, and the control means of said compound document managing means, in response to a request for setting or selecting the context information to or out of the data of the compound document, calls a necessary operation procedure of the context information managing means and the selection means with reference to the procedure table of the application corresponding to the data.

Also, the context information managing means of the application sets a plurality of different context information according to data to containers in which data is to be embedded and allocated in specific layout of said compound document, the selection means of the application selects specific context information out of the plurality of context information or combines the plurality of context information to specify the container, and the compound document managing means holds application information for designating an application to be started in association with the context information set to the data and includes means for starting the application designated by the application information according to the selected context information.

According to another aspect of the invention, a compound document managing system comprises compound document managing means for linking data produced by an application to data produced by other applications with identifiers and managing the data as a compound document, the application including:

context information managing means for setting or releasing context information indicative of semantics common among a plurality of applications to or from data linked to the compound document, and selection means for selecting specific context information set to the data to specify data corresponding to the selected context information, and the compound document managing means including control means responsive to a request for setting or selecting said context information to or out of data of the compound document for starting and controlling the context information managing means and the selection means.

In the preferred construction, the context information includes information of data distribution ranges, data presentation targets and data production sources, and history information.

In the preferred construction, the context information managing means of the application sets a plurality of different context information according to data to containers for linking data which are allocated in specific layout of the compound document, the selection means of the application selects specific context information among the plurality of context information or combines the plurality of context information to specify a corresponding container, and the compound document managing means holds application information for designating an application to be started in association with the context information set to the data and includes means for starting the application designated by the application information according to the selected context information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Preferred embodiments of the present invention will be described in detail with reference to the accompanying drawings.

Figure 1:
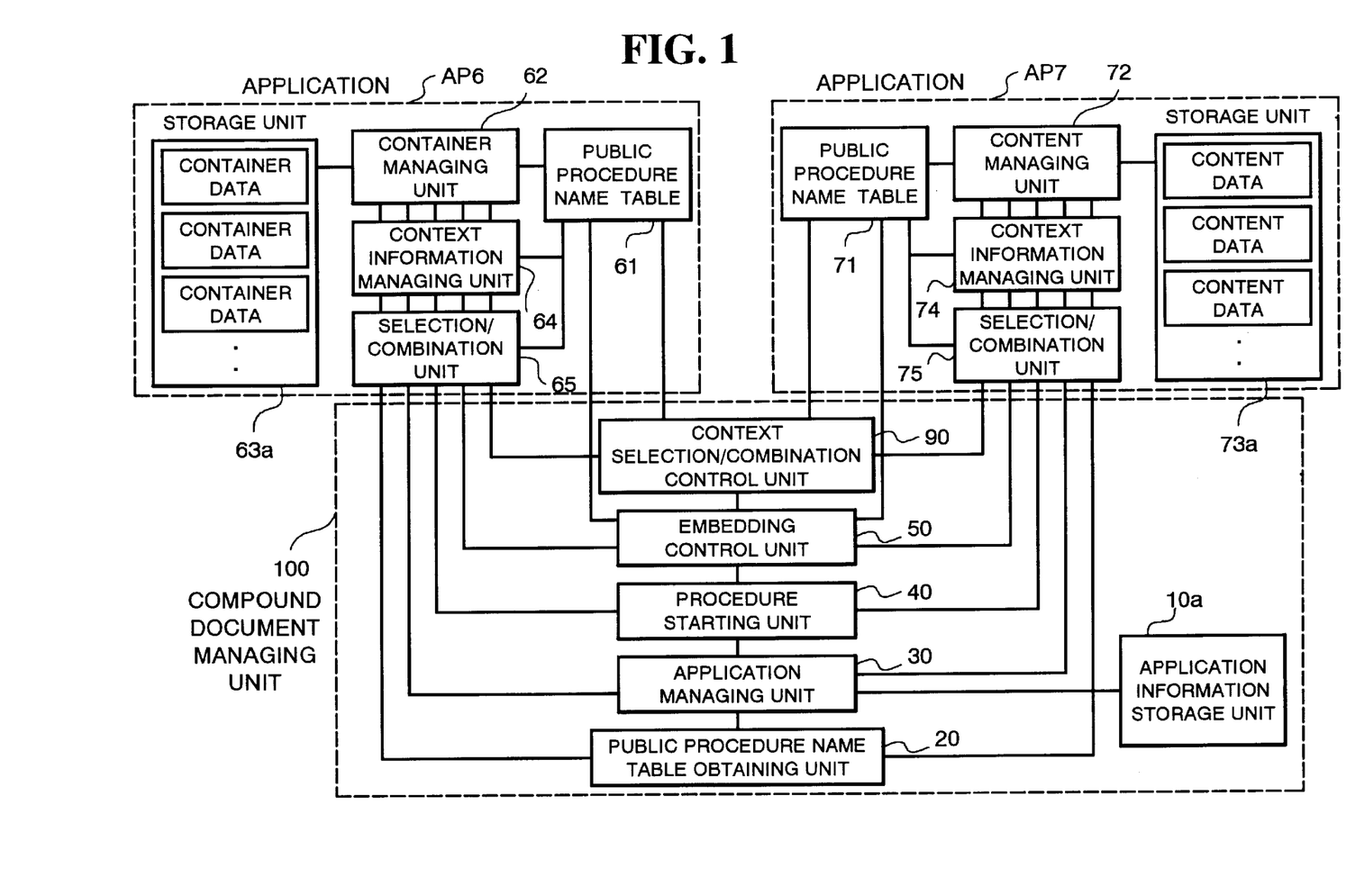
FIG. 1 is a block view showing a concept of a compound document managing system according to the first embodiment of the present invention.

FIG. 1 is a block diagram showing the structure of a compound document managing system according to the first embodiment of the present invention.

As illustrated in the figure, the compound document managing system of the present embodiment comprises a compound document managing unit 100 including an application information storage unit 10a, a public procedure name table obtaining unit 20, an application managing unit 30, a procedure stating unit 40, an embedding control unit 50 and a context selection/combination control unit 90, and applications AP6 and AP7 to be used by the compound document managing unit 100. The compound document managing unit 100 can be implemented as a part of an operating system as well as middleware intervening between an operating system and each application.

Implemented respectively in the applications AP6 and AP7 are public procedure name tables 61 and 71, a container managing unit 62 and a content managing unit 72, storage units 63a and 73a for multiplexing and storing container data and content data, respectively, context information managing units 64 and 74 each having context information setting and releasing functions, and selection/combination units 65 and 75 for extracting necessary data through selection and combination of context information, all of which components are predetermined for realizing a compound document managing function. The public name tables 61 and 71 store procedure addresses corresponding to procedure names and have predetermined formats.

Of the above-described components, the public procedure name table obtaining unit 20, the application managing unit 30, the procedure starting unit 40 and the embedding control unit 50 are identical to their counterpart components in the compound document managing unit 500 of the conventional compound document managing system shown in FIG. 9. The compound document managing unit 100 of the present embodiment is similarly structured to the compound document managing unit 500 of the conventional system except for the context selection/combination control unit 90. The application information storage unit 10a of the compound document managing unit 100 stores not only information for relating a document with a corresponding application but also information for relating context information with an application to be started based on the content information.

The public procedure name tables 61 and 71, the container managing unit 62 and the content managing unit 72 of the applications AP6 and AP7 are identical to their counterpart components of the applications AP60 and AP70, respectively, of the conventional compound document managing system shown in FIG. 9. The applications AP6 and AP7 of the present embodiment are realized by respectively adding, to the conventional applications AP60 and AP70, the context information managing units 64 and 74, the selection/combination units 65 and 75, and the storage units 63a and 73a for multiplexing and storing container data and content data, respectively. In the following, no description will be given of the components common to the conventional system.

Addresses of new procedures (function) provided by the context information managing units 64 and 74 and the selection/combination units 65 and 75 are stored in each entry of the public procedure name tables 61 and 71. Reference to the public procedure name tables 61 and 71 made by the public procedure name table obtaining unit 20 therefore makes it possible to call a new procedure provided by the context information managing units 64 and 74 and the selection/combination units 65 and 75.

The context information managing unit 64 of the application AP6 provides a function for setting or releasing information indicative of such attributes as data distribution ranges and user's information as context information to or from multiplexed container data stored in the storage unit 63a. In other words, the unit 64 provides a function in relating context information with container data.

The selection/combination unit 65 provides an interface function for selecting one of a plurality of context information related to container data by the context information managing unit 64 or combining a plurality of context information to present container data corresponding to selected or combined context information.

With a group of a plurality of containers multiplexed and stored in the storage unit 63a, to which containers different context information are related by using the context information managing unit 64 and the selection/combination unit 65, designation of specific context information leads to selective presentation of container data corresponding to the designated context information.

It is assumed in an example of materials for presentation that containers in which content data available only for a publisher is embedded are multiplexed and placed at the location of containers in which content data available for everyone is embedded. In this case, the container in which the embedded content data available for everyone has context information set thereto, which indicates that it is available for everyone (for everyone's use), while the container in which the embedded content data available only for a publisher has context information set thereto, which indicates that it is available only for a publisher (for publisher's personal use).

In this case, selecting context information "for everyone's use" through the selection/combination unit 65 allows the contents of a container to which context information "for everyone's use" is set to be seen but not memos as the contents of a container to which context information "for publisher's use" is set. It is possible to see materials including memos for a publisher by selecting context information "for publisher's personal use" in combination with the content information "for everyone" through the selection/combination unit 65.

The context information managing unit 74 of the application AP7 provides a function in relating context information (attribute information such as information of data distribution range and user information) with the multiplexed content data stored in the storage unit 73a. The selection/combination unit 75 provides an interface function for selecting one context information among the plurality of context information related to the content data by the context information managing unit 74 or combining the plurality of context information to present content data corresponding to the selected or combined context information.

With a group of content data multiplexed and stored in the storage unit 73a, to which data different context information is related by the context information managing unit 74 and the selection/combination unit 75, designation of context information leads to selective presentation of the contents of a container corresponding to the designated context information. It is assumed in an example of presentation materials that the contents of a container whose content data is available for everyone are flags and each flag has context information set thereto such as "this year" and "last year" as context information indicative of history (version). In this case, it is possible to produce such a material whose contents are changed into a graph of last year, for example, by selecting the context information "last year" through the selection/combination unit 75.

The context selection/combination control unit 90 of the compound document managing unit 100 controls a series of execution of such procedures as obtaining and starting an application related to context information set to a container or contents by the application managing unit 30, as well as starting the procedures prepared in the above-described context information managing units 64 and 74 and the selection/combination units 65 and 75 by the public procedure name tables 61 and 71 and the public procedure name table obtaining unit 20 and transferring the procedures to the above started application in order to set and release context information to and from the container or the contents and select and combine appropriate context information.

Figure 2:
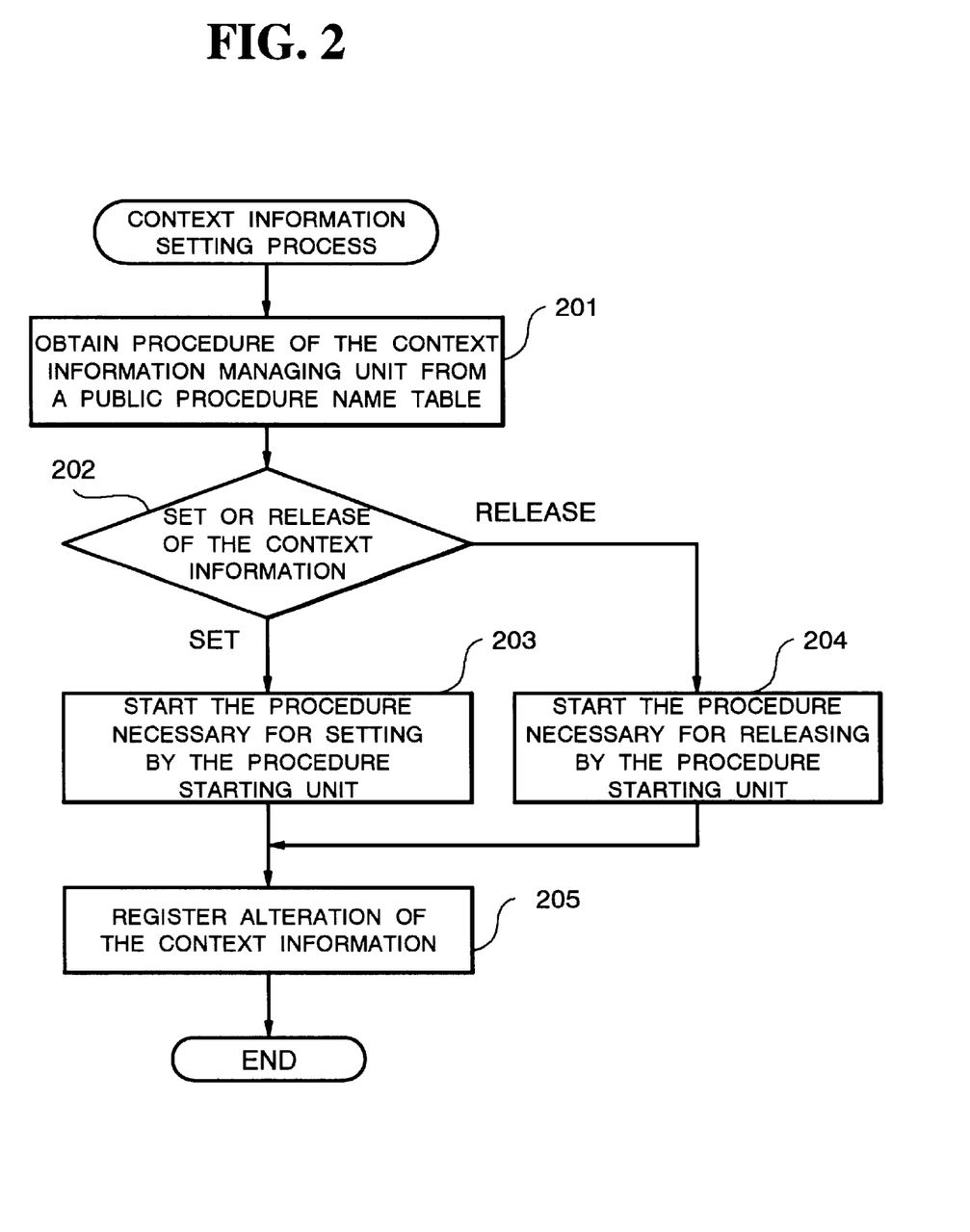
FIG. 2 is a flow chart explaining setting process of context information by a context selection/combination control unit of the first embodiment.
Figure 3:
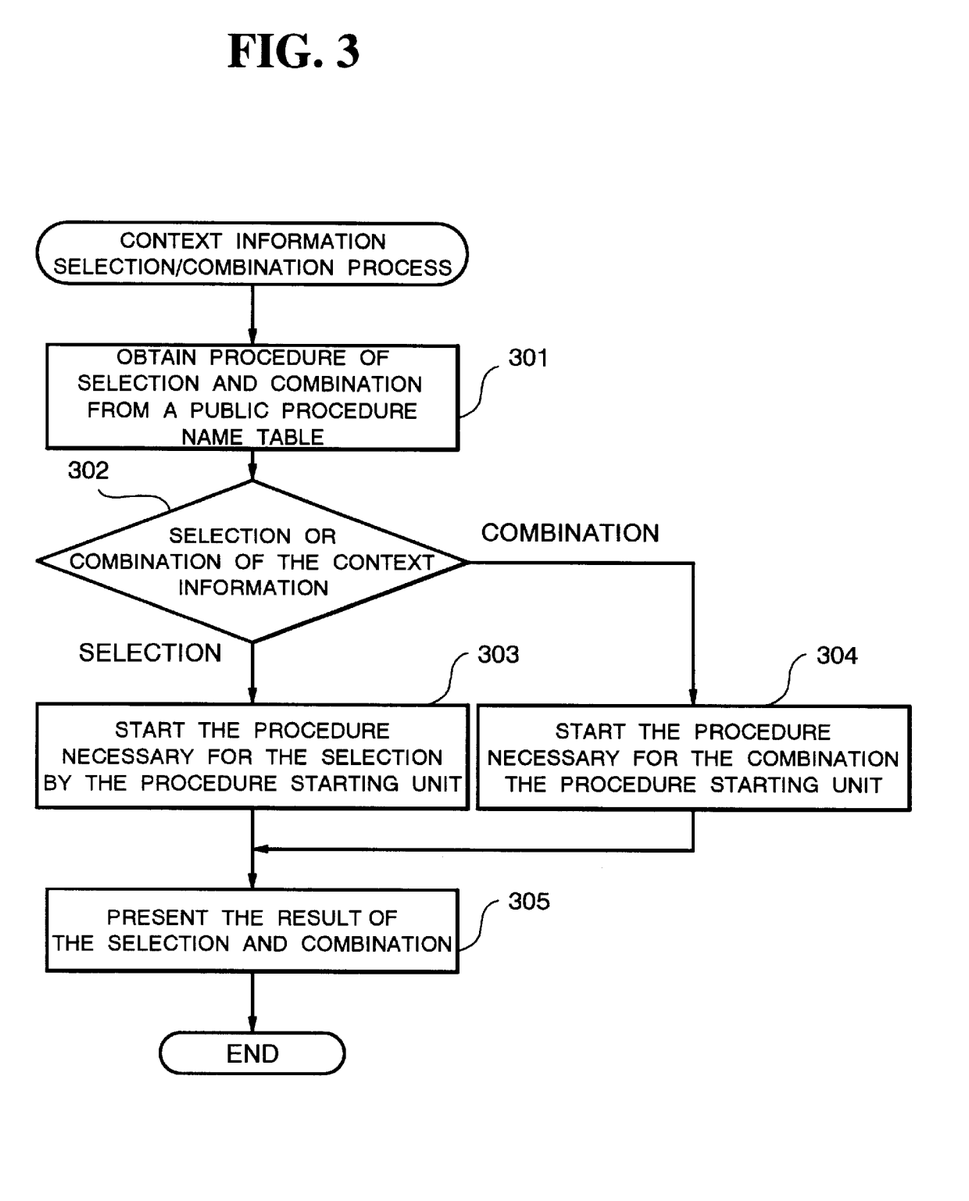
FIG. 3 is a flow chart explaining selection and combination process of the context information by the context selection/combination control unit of the first embodiment.
Figure 4:
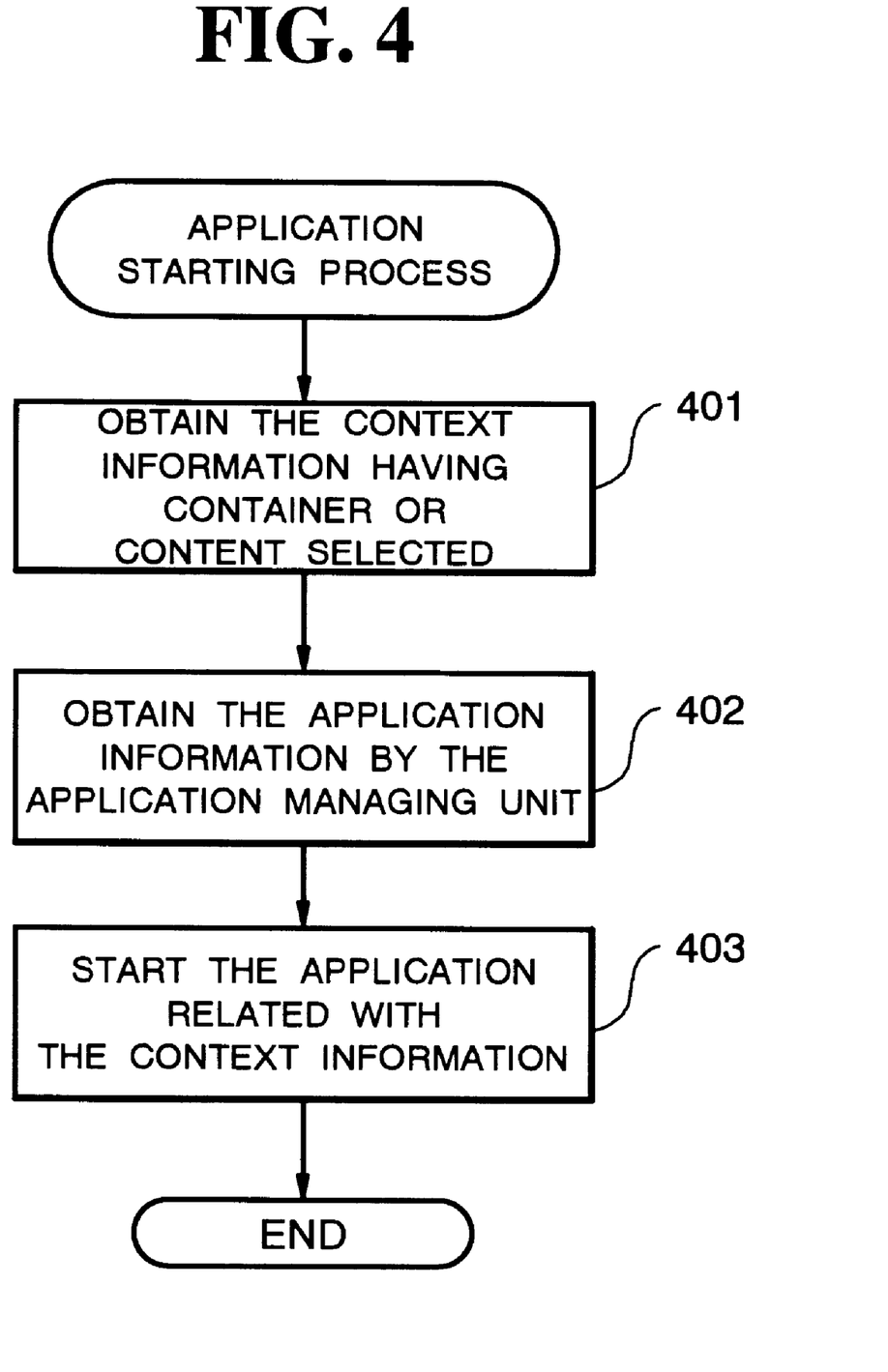
FIG. 4 is a flow chart explaining application starting process for the context information by the context selection/combination control unit of the first embodiment.

The flow charts illustrated in FIGS. 2 to 4 show the details of the processing executed by the context selection/combination control unit 90. FIG. 2 shows the details of the processing conducted by the context selection/combination control unit 90 for controlling the context information managing units 64 and 74 to set or release context information.

When in performing operations of context information on a container or content data, first, procedures provided by the context information managing units 64 and 74 are obtained with reference to the public procedure name tables 61 and 71 through the public procedure name obtaining unit 20 (Step 201). In this state, it is possible to select setting or release of context information to or from the container or content data (Step 202). In other words, a window for selecting setting and release of context information is presented as an interface.

Upon selecting of setting of the context information, procedures of the context information managing units 64 and 74 necessary for context information setting (or altering) operation are called and started by the procedure starting unit 40 (Step 203), thereby enabling context information to be set to a container or content data. The set context information is registered and stored in the storage units 63a and 73a so as to accompany the container or content data (Step 205).

Upon selecting of release of context information, procedures of the context information managing units 64 and 74 necessary for context information releasing operation are called and started by the procedure starting unit 40 (Step 204), thereby enabling release of context information from a container or content data. The results obtained by the release of the context information are registered and stored in the storage units 63a and 73a (Step 205).

FIG. 3 shows the details of the processing executed by the context selection/combination control unit 90 for controlling the selection/combination units 65 and 75 to select or combine context information.

When in selecting or combining context information set to the containers or content data, first, procedures presented by the selection/combination units 65 and 75 are obtained with reference to the public procedure name tables 61 and 71 through the public procedure name obtaining unit 20 (Step 301). In this state, it is possible to select or combine context information set to the containers or content data (Step 302). In other words, a window for selecting selection or combination of context information is presented as an interface.

When context information is selected, the procedures of the selection/combination units 65 and 75 necessary for context information selecting operation are called and started by the procedure starting unit 40 (Step 303), thereby enabling the context information set to the containers or context data to be selected. In other words, a window for selecting desired context information among the plurality of context information is presented as an interface. Then, the content data of the container corresponding to the selected context information is read out of the storage units 63a and 73 and presented (Step 305).

When combination of context information is selected (Step 302), the procedures of the selection/combination units 65 and 75 necessary for context information combining operation are called and started by the procedure starting unit 40 (Step 304). In other words, a window for combining desired context information among the plurality of context information is presented as an interface. Then, the content data of the containers corresponding to the combined context information is read out of the storage units 63a and 73a and presented (Step 305).

FIG. 4 shows the details of the processing executed by the context selection/combination control unit 90 for automatically starting a predetermined application related to context information.

When specific context information set to a container or content data is selected on a certain application by a pointing device etc., the context information is obtained (Step 401). Then, the application managing unit 30 obtains application information registered at the application information storage unit 10a (Step 402) to start an application related to the selected context information (step 403).

Next, the details of processing of the compound document managing system according to the present embodiment will be described with respect a specific example. Description will be given, for example, of a case where the application AP6 is designed as a presentation tool for use on a network. In the application AP6, content data is allocated on a container basis and each procedure of the container managing unit 62, which provides container operating procedures, is registered on the public procedure name table 61. To each container, context information, which denotes a reference mode (a mode indicating whether everyone's reference is possible or personal reference is possible) is set. Each procedure of the context information managing unit 64, which provides operation procedures for the context information, is registered on the public procedure name table 61. In addition, each procedure of the selection/combination unit 65, which provides procedures for making possible combinations of context information, is registered on the public procedure name table 61.

Figure 5:
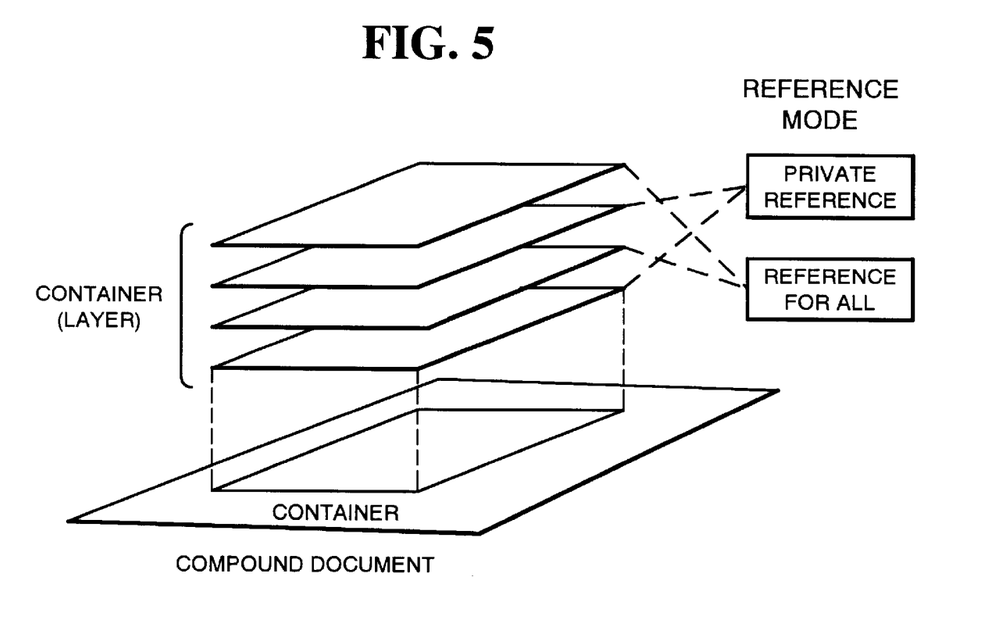
FIG. 5 is a view of one example showing an organization of the document of application AP 6.

As a result, the application AP6 has such a document structure as shown in FIG. 5 in which a plurality of containers are layered and multiplexed. Each container (layer= transparent window) is provided with context information indicative of a reference mode.

As to the context information indicative of a reference mode, information "available for everyone's reference" or information "personal reference" is correlated with each container. To each container, address information of electronic mail can be also set as context information. Then, it is structured such that an application for electronic mail can be started for delivering, to a network, content data taken out of a container corresponding to the address information of the electronic mail set as the context information.

With such a presentation tool, a compound document can be created that is structured to have containers (layers) in which a memo for explanation available only for a publisher is embedded and multiplexed on containers (layers) in which presentation data prepared beforehand for everyone's use is embedded. This compound document is apparently presented as a document with a memo for explanation (data for personal reference) and presentation data mixed with each other. When context information whose reference mode "available for everyone's reference" is selected by the selection/combination unit 65, however, a container to which the context information is set is resultingly selected to present presentation data without memos for explanation.

On the other hand, when both of the context information whose reference modes are "available for everyone's reference" and "available for personal reference" are combined by using the selection/combination unit 65 since it is desirable for a publisher to be able to see a memo for presentation as well during presentation, two containers corresponding to the respective modes are selected. As a result, a document including a combination of memos for explanation and presentation data is presented to the publisher. As described in the foregoing, a memo for explanation "available for personal reference" is presented to the publisher exclusively, while only the presentation data "available for everyone's reference" is presented to all the audience on the network.

In addition, when audience newly produces, in a presentation material, a container in which question data is to be embedded, the audience is allowed to set address information of electronic mail as context information attendant on the container. In answering to the question, when the publisher selects a container to which the address information of the electronic mail is set as context information, a related electronic mail application is automatically started. As a result, the publisher is allowed to make an answer referring to the audience's question data by the started electronic mail application and deliver the answer to the set address of the electronic mail through the network.

Figure 6:
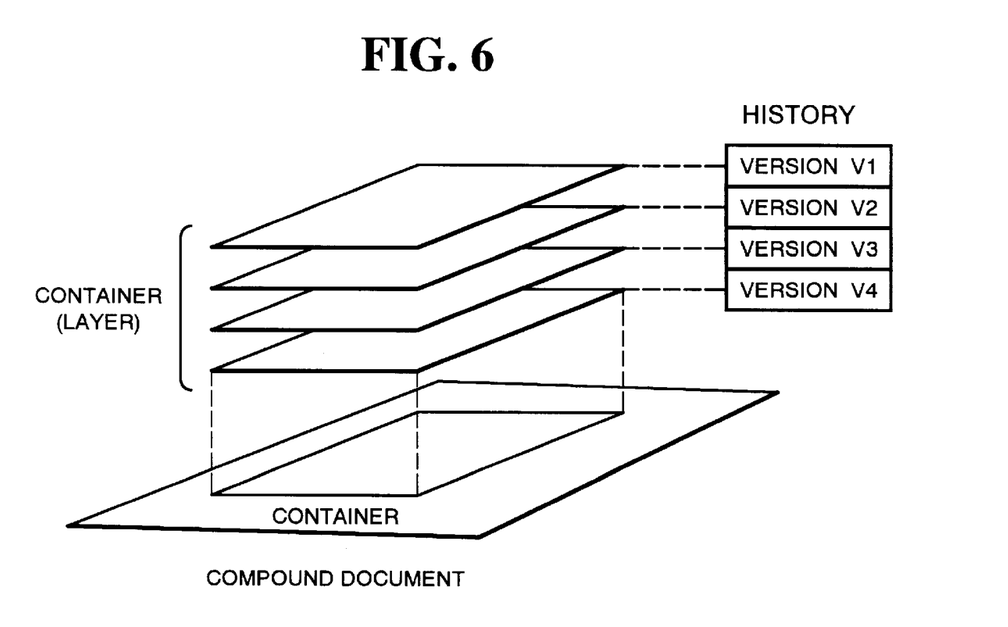
FIG. 6 is a view of second example showing an organization of the document of application AP 6.

FIG. 6 shows an example in which history information showing version (V1, V2, . . . , Vn) are set as context information to a plurality of containers multiplexed. Setting history information to a plurality of containers as shown in the figure facilitates selecting data of a specific version through the selection/combination unit 65.

In other words, the present embodiment makes it possible to have a common procedure for switching output (presentation) targets and versions according to semantic information (information indicative of history, priority and significance) of data, which procedure conventionally varies with each application. As a result, data to be used in a distributed environment or data differing in time with each other can be jointly used by different applications.

Figure 7:
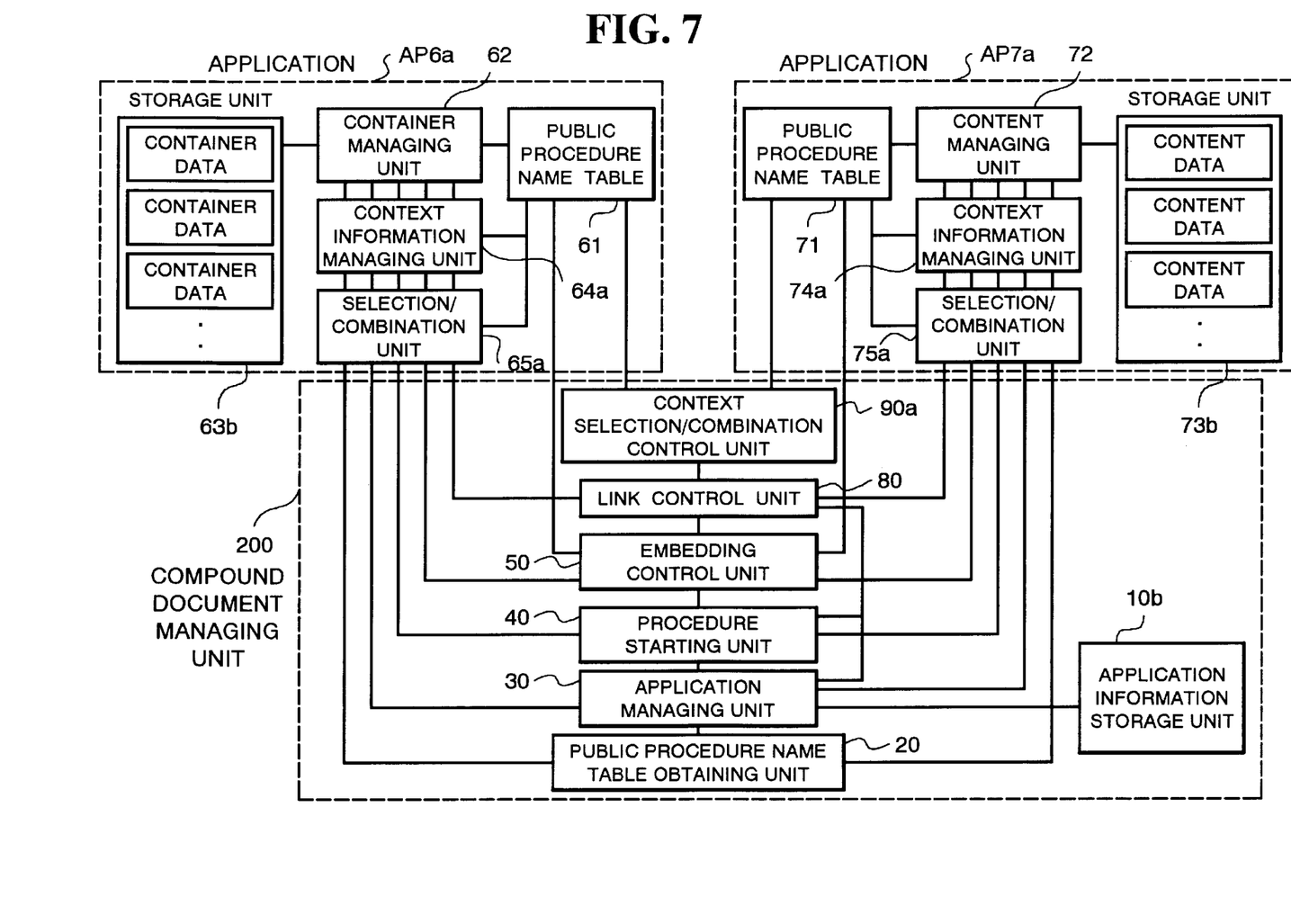
FIG. 7 is a block view showing a concept of a compound document managing system according to another embodiment (second embodiment) of the present invention.

FIG. 7 is a block diagram showing the structure of a compound document managing system according to the second embodiment of the present invention. In this embodiment, a compound document managing unit 200 is realized by adding a context selection/combination control unit 90*a* to the compound document managing unit 600 of the conventional system shown in FIG. 10. In addition, implemented respectively in the applications AP6*a* and AP7*a* are public procedure name tables 61 and 71, a container managing unit 62, a content managing unit 72, storage units 63*a* and 73*a* for multiplexing and storing container data and content data, context information managing units 64*a* and 74*a* each having context information setting and releasing functions, and selection/combination units 65*a* and 75*a* for extracting necessary data through selection and combination of context information, all of which components are predetermined for realizing a compound document managing function.

Of the above-described components, the compound document managing unit 200 of the present embodiment is structured identically to the conventional compound document managing unit 600 with the only difference being that the context selection/combination control unit 90*a* is added. An application information storage unit 10*b* of the compound document managing unit 200 stores not only information for relating a document with a corresponding application but also information for relating context information with an application to be started based on the context information. The function of the context selection/combination control unit 90*a* is the same as that of the counterpart in the first embodiment shown in FIG. 1.

The functions of the context information managing units 64*a* and 74*a* and the selection/combination units 65*a* and 75*a* of the applications AP6*a* and AP7*a* of the present embodiment are basically the same as those of the counterparts in the first embodiment shown in FIG. 1. In this embodiment, the link control unit 80 does not embed data of the application AP7*a* in a container of a document of the application AP6*a* but links only an identifier indicative of document data being referred to of the application AP7*a* with a container.

The present embodiment differs from the first embodiment only in that content data of the application AP7*a* is not embedded in a container of a document of the application AP6*a* but the container is linked by the link control unit 80. It is common between the present embodiment and the first embodiment that context information is set to each container or content data by the context information managing units 64*a* and 74*a* and selection and combination of context information is carried out by the selection/combination units 65*a* and 75*a*.

Figure 8:
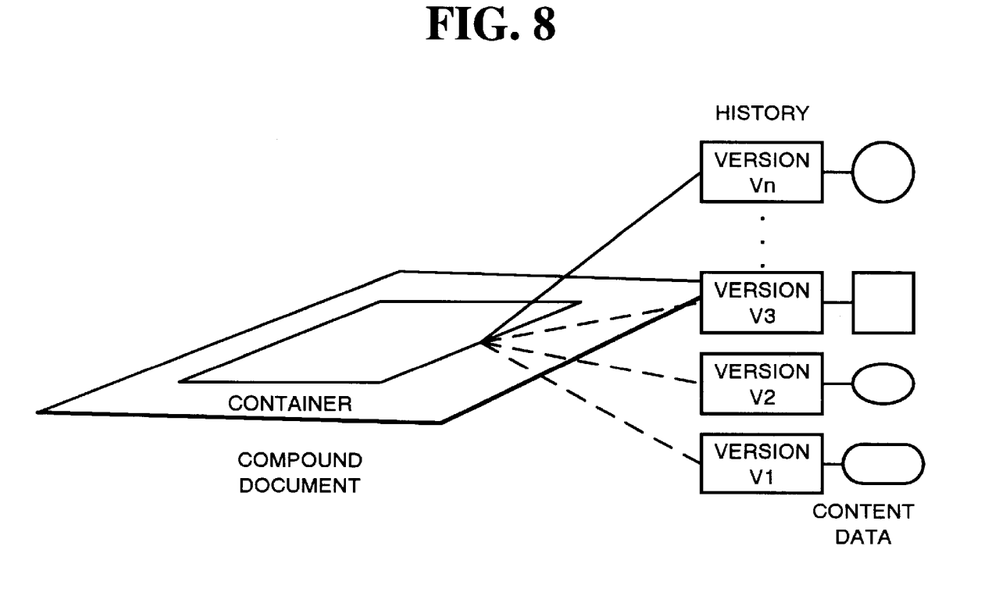
FIG. 8 is a view of an example when the context information showing history is set in every linked data.

FIG. 8 shows an example in which history information showing version (V1, V2, . . . , Vn) are set as context information to content data linked with a container. Specific history version data can be selectively presented by the selection/combination unit 65*a*.

As described in the foregoing, by adding, to an application using a compound document managing unit, a function to set or release context information indicative of data distribution ranges, e.g., user's information, to or from data, the present invention allows compound documents to be related with common semantic information and allows associated procedures for using the information to be normalized. The present invention therefore facilitates search for common update information of data among application programs, thereby simplifying data communication among a plurality of users.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A compound document managing system comprising:
   a first application associated with a data;
   a second application associated with a compound document to which the data can be embedded; and
   compound document managing means for managing the compound document and for embedding the data associated with the first application to the compound document,
   wherein at least one of the first and second applications includes:
      context information managing means for setting or releasing context information indicative of semantics among the first and second applications to or from the data embedded in the compound document; and
      selection means for selecting specific context information set to the data embedded in the compound document;
   wherein the compound document managing means includes control means for initiating and controlling the context information managing means and the selection means in response to a request for setting or selecting the context information to or from the compound document,
   wherein the context information managing means sets a plurality of different context information in containers allocated in a specific layout in the compound document,
   wherein the selection means selects the specific context information among the plurality of context information or combines the plurality of context information to specify a corresponding container,
   wherein the first application is an application for electronic mail,
   wherein the selected context information corresponds to address information of the electronic mail, and
   wherein content data taken out of the corresponding container is delivered to a network and sent out as the electronic mail by the first application.

2. A compound document managing system comprising:
   a first application associated with a data;
   a second application associated with a compound document to which the data can be linked; and
   compound document managing means for managing the compound document and for linking the data produced by the first application to the compound document with identifiers,
   wherein at least one of the first and second applications includes:
      context information managing means for setting or releasing context information indicative of semantics among the first and second applications to or from the data linked in the compound document; and
      selection means for selecting specific context information set to the data linked in the compound document;
   wherein the compound document managing means includes control means for initiating and controlling the context information managing means and the selection means in response to a request for setting or selecting the context information to or from the compound document,
   wherein the context information managing means sets a plurality of different context information in containers allocated in a specific layout in the compound document,
   wherein the selection means selects the specific context information among the plurality of context information or combines the plurality of context information to specify a corresponding container,
   wherein the compound document managing means holds application information for designating an application to be started in association with the context information set to the data and includes means for starting the application designated by the application information according to the selected context information,
   wherein the data associated with the first application is a memo for use by an instructor, wherein the compound document is a presentation document to be presented by the instructor to a plurality of persons to be instructed, the compound document including the memo for use by the instructor, and
   wherein, when the selection means selects the specific context information corresponding to a descriptor indicating that a document is available for everyone's reference, contents of a first container that includes the memo and contents of a second container that includes the presentation document are outputted to the instructor, and wherein only the contents of the second container are outputted to the plurality of persons to be instructed.

* * * * *